United States Patent [19]
Itou

[11] Patent Number: 5,081,537
[45] Date of Patent: Jan. 14, 1992

[54] COLAR IMAGE INFORMATION INSERTING CIRCUIT FOR VIDEO SIGNAL RECORDING AND REPRODUCING SYSTEM

[75] Inventor: Yuuzi Itou, Fukaya, Japan

[73] Assignee: Kabushiki Kaisha Toshiba, Kawasaki, Japan

[21] Appl. No.: 359,280

[22] Filed: May 31, 1989

[30] Foreign Application Priority Data
Jun. 1, 1988 [JP] Japan .................. 63-132617

[51] Int. Cl.⁵ .............................................. H04N 9/79
[52] U.S. Cl. .................................... 358/310; 358/22; 358/40; 358/326
[58] Field of Search .............. 358/40, 22, 310, 326, 358/183; 340/722

[56] References Cited
U.S. PATENT DOCUMENTS
4,405,946 9/1983 Knight .
4,561,013 12/1985 Fukui et al. .................. 358/326 X
4,613,906 9/1986 Tanaka et al. ................ 358/22 X
4,639,768 1/1987 Ueno et al. .
4,665,438 5/1987 Miron et al. .
4,811,085 3/1989 Idei et al. .

Primary Examiner—Robert L. Richardson
Attorney, Agent, or Firm—Cushman, Darby & Cushman

[57] ABSTRACT

A circuit for inserting color information into a video signal during either recording or reproduction. The circuit extracts a burst signal from a chroma signal input and generates a first color carrier phase-locked with the burst signal. The chroma signal is modulated in accordance with the burst signal and the first color carrier. A second color carrier is generated from the first color carrier. The two color carriers are mixed together creating a color signal which will be selectively inserted into the chroma signal. The insertion of the color signal is controlled by an additional image information generating circuit.

16 Claims, 4 Drawing Sheets

COLAR IMAGE INFORMATION INSERTING CIRCUIT FOR VIDEO SIGNAL RECORDING AND REPRODUCING SYSTEM

BACKGROUND OF THE INVENTION

1. Field of the Invention

This invention generally relates to a video signal processing apparatus and, more particularly, to a magnetic recording/reproducing apparatus for recording/reproducing a video signal, which can be a incorporated in camera built-in video tape recording/reproducing apparatus (VTR).

2. Description of the Related Art

Camera built-in VTRs have recently been developed. Some camera built-in VTRs incorporate a character signal generating circuit to display a title and a date on a camera EE image or a reproduced image. Generally, a character signal generating circuit separates the horizontal and the vertical sync signals from an EE video signal or a reproduction signal, obtains the horizontal and the vertical positions of an image by using horizontal and vertical counters, and sets a display position for the character information, thereby inserting the character information in the video signal.

According to a recently developed apparatus, when a character display is to be performed, characters are displayed in color or displayed in white or with a white frame.

Characters can be relatively easily colored by manipulating the R, G, and B signals, for example during a recording operation the R signal could be set at logic "1" (high level) and outputs corresponding to the G and B signals could be set at logic "0" (low level). In this case, an R (red) signal would be recorded at a character position.

In reproduction, a title or date is sometimes inserted in the signal. In some camera built-in VTRs, camera circuits are turned off during reproduction in order to save power. In such an arrangement, the above-described system of inserting character information in a video signal cannot be employed.

In certain camera built-in VTRs, the R, G, and B signals cannot be easily extracted by video signal processing circuit. If primary color (R, G, and B) filters are used in an imaging section, extraction of the R, G, and B signals can be easily performed. However, if filters of intermediate colors such as cyan and magenta are used, an arithmetic operation of a video signal must be performed to obtain the R, G, and B signals. In this step, coloring of character information is performed. Thereafter, the R, G, and B signals must be converted into the (R−Y), (B−Y), and (G−Y) color difference signals. In this case, in order to stabilize hues, a phase-locked loop must be added, thus complicating the system.

As described above, especially in the conventional camera built-in VTRs, no technique is available which can be suitably used to add colored character information in both recording and reproduction modes. To easily add color image information added in both recording and reproduction modes conventional video signal processing apparatuses in, a great change in existing video signal processing technology is required.

SUMMARY OF THE INVENTION

It is, therefore, an object of the present invention to provide a simple, new and improved apparatus having a function for coloring inserting color image information into a video signal in a chroma signal processing circuit.

According to one aspect of the present invention, there is provided a chroma signal processing apparatus comprising:

extracting means for extracting a burst signal from a chroma signal;

generating means for generating a first color carrier phase-locked with the burst signal the extracting means;

modulating means for modulating the chroma signal in accordance with the burst signal and the first color carrier;

means for obtaining a second color carrier by shifting the phase of the first color carrier;

means for obtaining a color signal by mixing the second color carrier with the first color carrier;

means for generating additional image information to be added to the chroma signal; and means for inserting the color signal into the chroma signal in accordance with the additional image information.

According to another aspect of the present invention, in a recording mode, an output from a phase-locked loop circuit is utilized. The phase-locked loop circuit extracts a burst signal from a chroma signal output of an automatic color control circuit (ACC circuit) and generates a carrier phase-locked with the burst signal. A color signal is generated by mixing a first color carrier, the output from the phase-locked loop circuit, with a second color carrier obtained by shifting the phase of the first color carrier. The color signal and the chroma signal are respectively supplied to one and the other terminals of a switch. The switch is controlled by a circuit which generates the additional image information.

According to still another aspect of the present invention, in a reproduction mode, a low-frequency chroma signal reproduced from a video head is converted into a high-frequency chroma signal having an original frequency. The converted signal is passed through a comb filter to remove any unnecessary component. A phase-locked loop circuit extracts a burst signal from the high-frequency chroma signal and detects a phase difference between the burst signal and an output from a reference oscillator. A conversion carrier used by the frequency converting means is controlled on the basis of the phase difference so as to phase-lock the burst signal with the output from the reference oscillator. A color signal is generated by mixing a first color carrier, the output from the reference oscillator with a second color carrier obtained by shifting the phase of the first color carrier. A switch is controlled by a circuit which generates the additional image information.

According to the above-described arrangements, color character signals can be obtained in both the recording and reproduction modes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
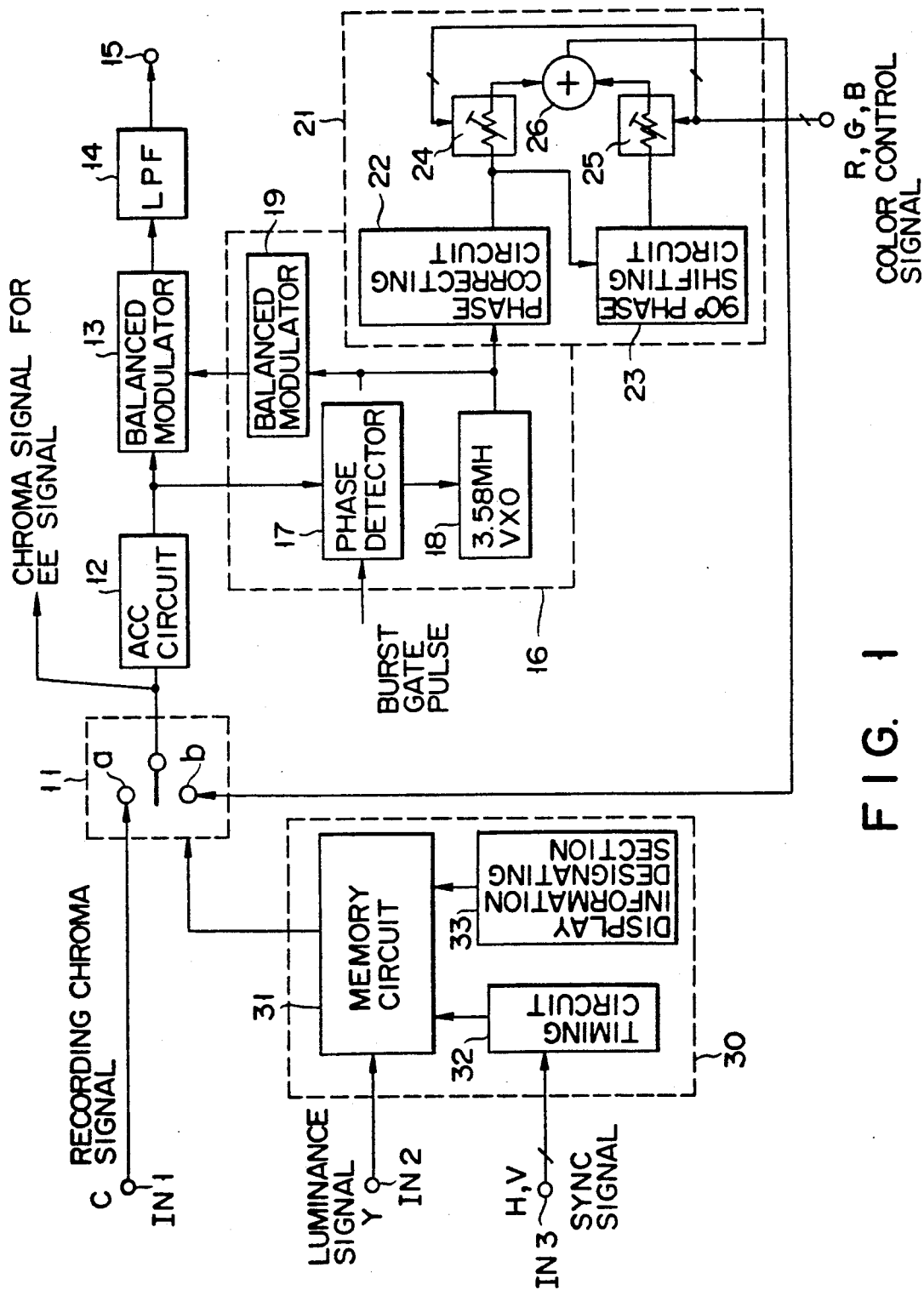
FIG. 1 is a block diagram showing a recording system according to an embodiment of the present invention.

Reference will now be made in detail to the presently preferred embodiments of the invention as illustrated in the accompanying drawings, in which like reference characters designate like or corresponding parts throughout the several drawings.

FIG. 1 shows a camera built-in magnetic recording/reproducing apparatus (VTR) in a recording mode according to the embodiment. A video signal obtained by, e.g., a camera (not shown) is supplied to a recording/reproducing section (not shown) as a camera circuit and is separated into luminance and recording chroma signals. Of these signals, the recording chroma signal is input to terminal IN1 which is connected to terminal a of a switch 11. The chroma signal output from the switch 11 is supplied to an automatic color control circuit (ACC circuit) 12, and the amplitude of the burst signal is set to a predetermined level. The chroma signal output from the ACC circuit 12 is supplied to a balanced modulator 13 and is converted into a signal with a recording frequency. In this case, the 3.58 MHz chroma signal is converted into a 688 kHz low-frequency chroma signal and is supplied to a terminal 15 through a low-pass filter 14. The low-frequency converted chroma signal is mixed with an FM-modulated luminance signal by a mixing circuit (not shown), and the mixed signal is recorded on a magnetic tape through a rotary head of a VTR mechanical section (not shown).

The output from the ACC circuit 12 is supplied to a phase detector 17 of a carrier generating section 16 for generating a frequency-conversion carrier. The phase detector 17 detects a phase difference between an output from a voltage-controlled quartz oscillator (VXO) 18 and an input burst signal, and supplies the differential voltage to the control terminal of the VXO 18. The oscillation frequency of the VXO 18 is thereby synchronized with the phase of the burst signal. The output from the VXO 18 is frequency-converted by a balanced modulator 19 to have a frequency of 3.58 MHz+688 kHz and is used as a frequency-conversion carrier in the balanced modulator 13.

The oscillation output from the VXO 18 is also supplied to a color signal generating circuit 21. The circuit 21 comprises a phase correcting circuit 22 for correcting the phase of an output from the VXO 18, a phase shifting circuit 23 for delaying the phase of an output from the circuit 23 by 90°, adjusters 24 and 25 for respectively adjusting the levels of outputs from the circuits 22 and 23, and an adder 26 for mixing outputs from the adjusters 24 and 25. The hue of the output color signal from the color signal generating circuit 21 can be changed by the adjusters 24 and 25. The output color signal is supplied to the other input terminal b of the switch 11.

The switch 11 is controlled by a control pulse from the circuit that generates the additional image information 30. The Switch 11 is set to the a side when no image information is to be inserted into the chroma signal, and it is set to the b terminal when image information is to be inserted into the chroma signal.

The circuit for generating additional image information 30 comprises a memory circuit 31 for storing image data, e.g., a date and a title by supplied to an input terminal IN2 as binary data of a luminance signal of an input video signal, a timing circuit 32 for setting the read and write timings with respect to the memory circuit 31, and a display information designating section 33 for selecting specific data (a date, a title, or the like) to be read out from the data stored in the memory circuit 31. The timing circuit 32 sets a display position of image data, such as characters, by using the horizontal and the vertical sync signals H and V of an input video signal supplied to an input terminal IN3 and an internal clock.

Figure 2:
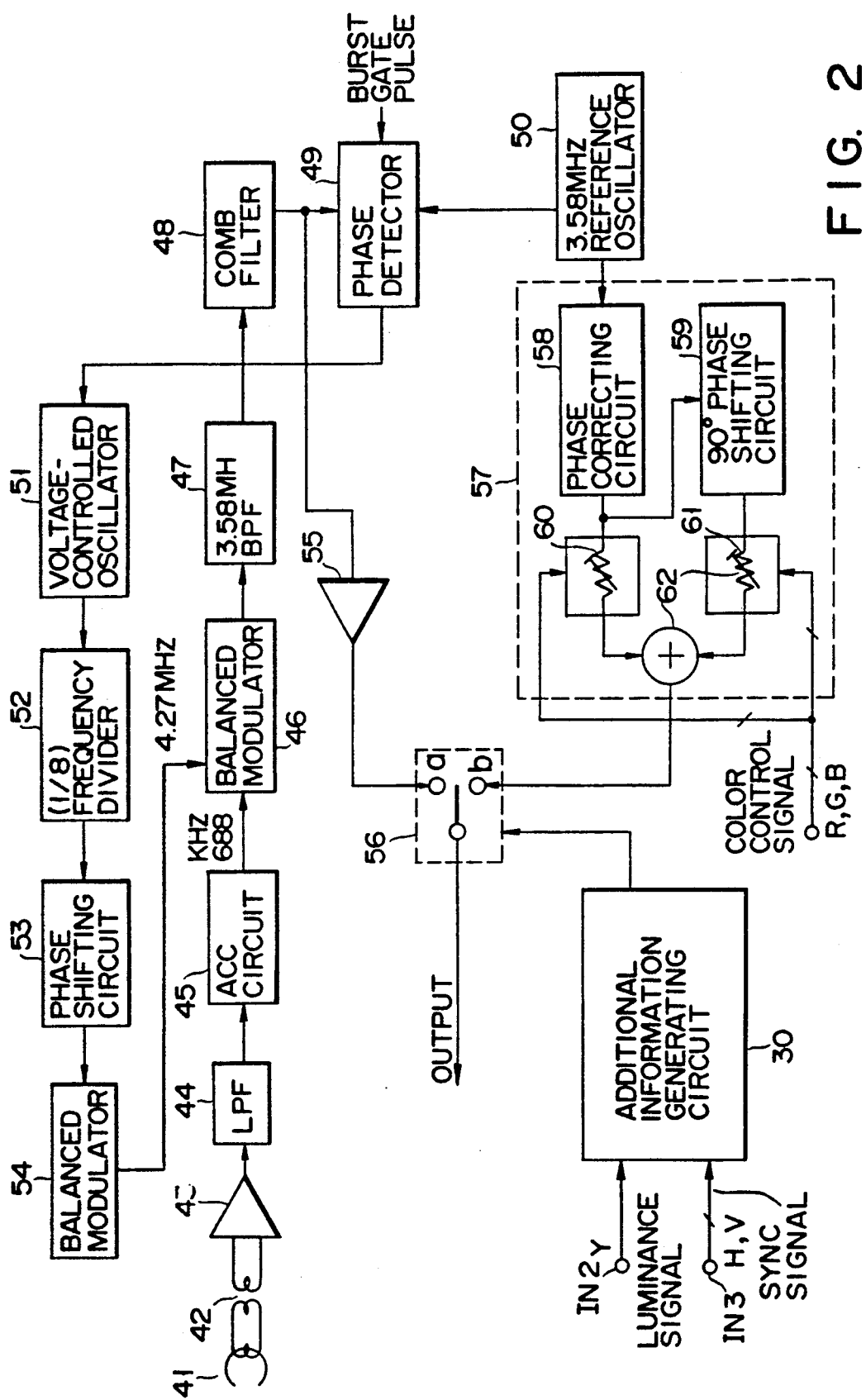
FIG. 2 is a block diagram showing a reproducing system according to an embodiment of the present invention.

FIG. 2 shows an embodiment in which the present invention is applied to a reproducing system of a magnetic recording/reproducing apparatus.

An output from a video head 41 is supplied to a low-pass filter 44 through a rotary transformer 42. In this case, a low-frequency converted chroma signal of 688 kHz is extracted and is supplied to an automatic color control circuit (ACC circuit) 45. The amplitude of the chroma signal is set to a predetermined level by the ACC circuit 45 and is supplied to a balanced modulator 46 to regain its original frequency. The chroma signal whose frequency has been returned to 3.58 MHz is supplied through a band-pass filter 47 to a comb filter 48 for removing crosstalk. A reproduction chroma signal output from the comb filter 48 is supplied to one terminal a of a switch 56 through a color killer circuit 55 and at the same time is supplied to a phase detector 49.

The phase detector 49 detects a phase difference between the burst signal and a 3.58 MHz reference oscillation output from a quartz oscillator 50. A differential output from the phase detector 49 is supplied to the control terminal of a voltage-controlled oscillator 51. An output from the oscillator 51 is then divided by a frequency divider 52 and is supplied to a balanced modulator 54 through a phase shifting circuit 53. The modulator 54 generates a 4.27 MHz carrier for frequency conversion and supplies it to the balanced modulator 46. A loop constituted by the phase detector 49, the voltage-controlled oscillator 51, the frequency divider 52, the phase shifting circuit 53, the balanced modulators 54 and 46, the band-pass filter 47, and the comb filter 48 serves as a phase-locked loop for phase-locking the burst signal of the chroma signal with the oscillation output phase of the reference oscillator 50.

The color signal generating circuit 57 uses an output from the reference oscillator 50 and it comprises a phase correcting circuit 58, a phase shifting circuit 59, adjusters 60 and 61, and an adder 62. The color signal generating circuit 57 and the reference oscillator 50 are identical with the color signal generating circuit 21 and the voltage-controlled quartz oscillator 18 shown in FIG. 1, respectively. In practice, the same circuits are commonly used for both operation. The reference oscillator 50 is switched to a free oscillation state during reproduction and to serve as the oscillator 18 of a voltage-controlled type during recording.

An output from the color signal generating circuit 57 is supplied to a terminal b of the switch 56. The switch 56 is controlled by the circuit for generating additional information 30 in the same manner as described with reference to FIG. 1. Consequently, the switch 56 outputs a reproduction chroma signal in which a color signal from the circuit 57 is inserted replace it and to color image data to be added, such as the circuit is identical with chroma signal processing circuits of magnetic recording/reproducing apparatus. Only the color signal generating circuit 57 and the switch 56 are newly added, and moreover, the circuit 57 can also serve as the circuit 21 in the recording system. Therefore, color image information can be inserted into the chroma signal by a simple and inexpensive alteration of existing systems. In addition, the color of the image information to be inserted into the chroma signal can be adjusted to be easily seen in accordance with a background color by using the adjusters 60 and 61.

Figure 3:
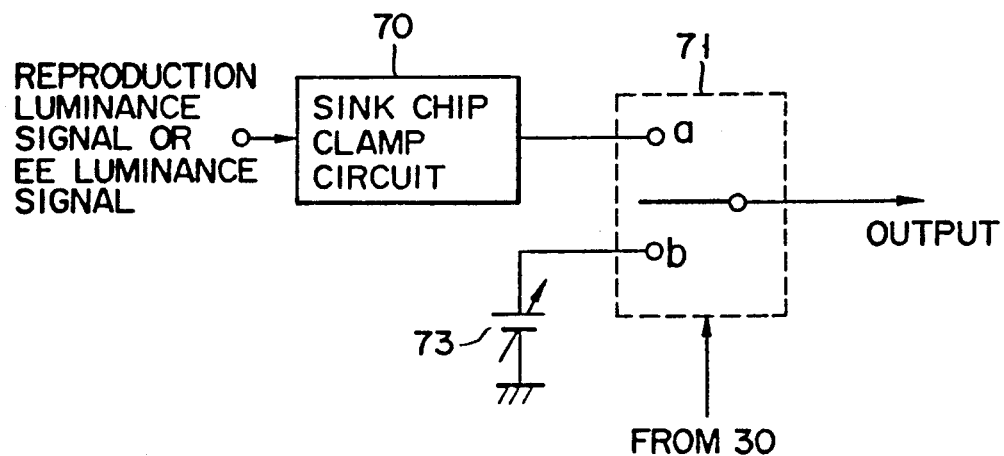
FIG. 3 is a block diagram showing a luminance signal processing system according to an embodiment of the present invention.

FIG. 3 shows a circuit for replacing the position at which a character signal or the like is inserted on a luminance signal in the path of the luminance signal with a predetermined DC level. A reproduction luminance signal or an EE luminance signal from a camera is input to one input terminal a of a switch 71 through a sink chip clamp circuit 70. A DC voltage is applied from a DC voltage source to the other input terminal b. The switch 71 is controlled by an output from the circuit for generating additional information 30 described with reference to FIGS. 1 and 2 so that a character display position is set to a predetermined DC level.

Figure 4:
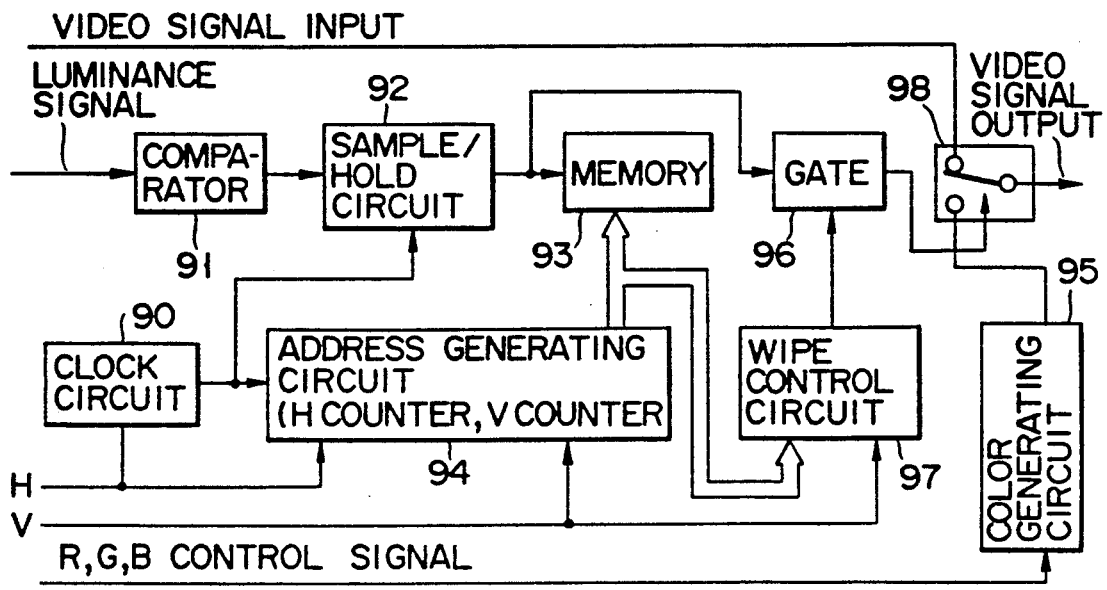
FIG. 4 is a block diagram showing a detailed arrangement of a circuit for generating additional information in FIGS. 1 and 2.

FIG. 4 is a block diagram showing a so-called digital superimpose circuit as a practical example of the additional information generating circuit in FIGS. 1 and 2.

Digital superimpose is a function for storing a luminance signal of a title image, which has been obtained by a camera section in advance. The luminance signal is stored as digital data in a memory (RAM). The data is then read out from the memory and superposed on a recorded or reproduced image. According to a characteristic feature of the embodiments, a desired color selected from eight colors is given to the title (character) portion during this superimpose operation.

Figure 5A:
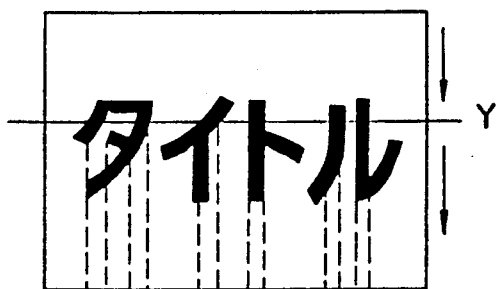
FIG. 5 explains the operation of the circuit in FIG. 4.
Figure 5B:
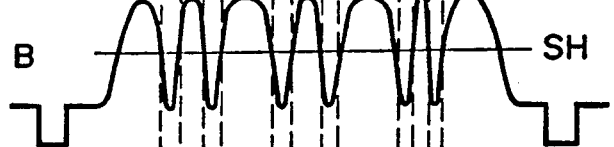
Figure 5C:

In FIG. 5, the luminance signal 77 is shown in a horizontal period of a video signal obtained by imaging a title image 75 (in which Japanese characters equivalent to the word "title" is drawn in katakanas. This luminance signal is compared by a comparator 91 with a threshold level denoted by reference symbol SH for each horizontal line so as to be converted into binary data 79. In order to decompose a single frame to be stored into 256 horizontal dots and 256 vertical dots, this data is sampled by a sample/hold circuit 92 and is stored in a memory 93 as data in which "0" and "1" respectively represent white and black.

The above sampling is performed by using a clock signal having a frequency of about 4 MHz and synchronized with a horizontal sync signal H generated by a clock circuit 90. An address to the memory 93 is generated by an address generating circuit 94 including H and V counters.

When the data stored in the memory 93 is to be superimposed on a screen image, the data in the memory 93 is read out in synchronization with the horizontal and vertical sync signals H and V. A switch 98 is controlled by the readout data. When data is "1", the signal of the screen image is replaced with a desired coloring signal generated by the color signal generating circuit 95 (corresponding to the color signal generating circuits 21 and 57). When the data is "0", the chroma signal is unchanged.

Note that a gate circuit 96 in FIG. 4 is used to generate various timing signals for superimpose and constitutes a CMOS gate array. In addition, a wipe control circuit 97 is used when a title image to be superimposed is wiped on the screen.

Figure 6:
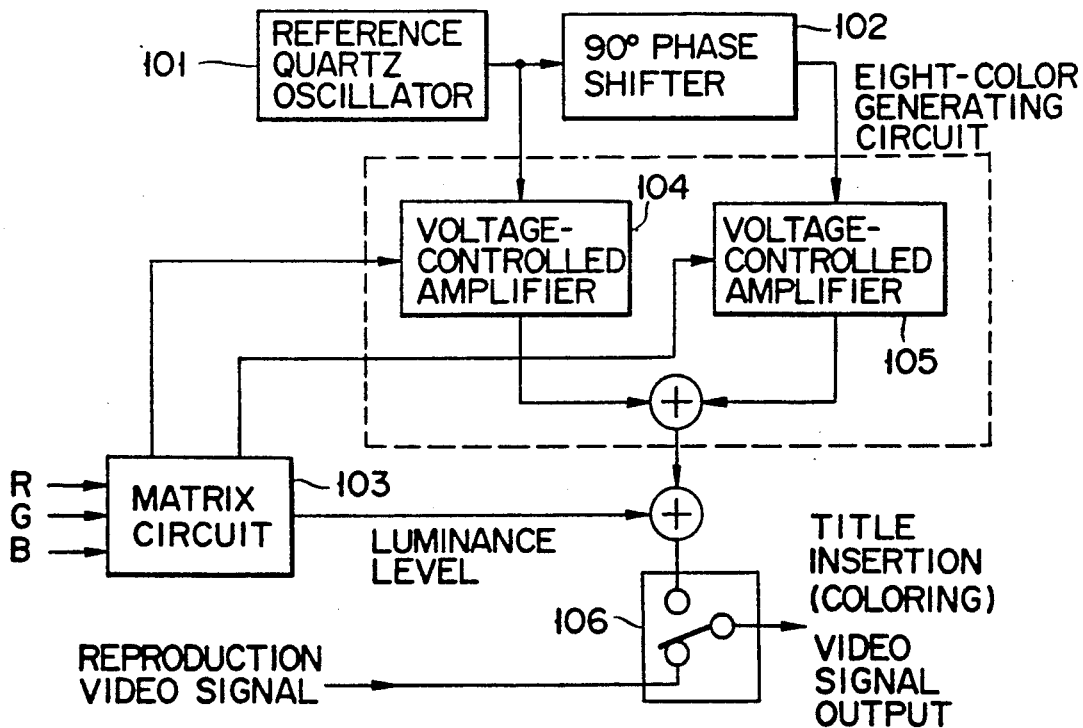
FIG. 6 is a block diagram showing a detailed arrangement of a color signal generating circuit in FIGS. 1 and 2.

FIG. 6 is a block diagram showing a color signal generating circuit as a practical example of the color signal generating circuits 21 and 57 in FIGS. 1 and 2 (corresponding to the color generating circuit 95).

A carrier chroma signal is obtained by mixing an output signal from a reference quartz oscillator 101 with a signal obtained by shifting the phase of the output signal by 90° using a phase shifter 102 a mixing ratio is set by controlling the first and second voltage-controlled amplifiers 104 and 105, to which the carrier chroma signals are supplied. Color signals R, G, and B from the digital superimpose circuit section FIG. 4 are respectively converted into voltages by a matrix circuit 103. By using these converted voltages, eight (white, yellow, cyan, green, magenta, red, blue, and black) chroma signals can be generated. By setting luminance levels corresponding to the respective colors, desired color signals can be obtained. The above-described superimpose is performed by replacing a video signal with a colored title signal obtained in this manner by a switch 106.

As has been described above, according to the present invention, color of image data, such as can be inserted into a chroma signal by using a simple arrangement.

What is claimed is:

1. A chroma signal processing apparatus comprising:
 means for extracting a burst signal from a chroma signal;
 means for generating a first color carrier phase-locked with the burst signal;
 means for modulating the chroma signal in accordance with the burst signal and the first color carrier;
 means for obtaining a second color carrier by shifting the phase of the first color carrier;
 means for obtaining a color signal by mixing the second color carrier with the first color carrier;
 means for generating additional image information to be inserted into the chroma signal; and
 means for inserting the color signal into the chroma signal in accordance with the additional image information.

2. An apparatus according to claim 1, wherein the extracting means includes an automatic color control circuit for controlling the level of the burst signal.

3. An apparatus according to claim 2, wherein the generating means includes a phase-locked loop for generating the first color carrier phase-locked with the burst signal.

4. An apparatus according to claim 3, wherein the phase-locked loop includes:
  a voltage-controlled variable oscillator for obtaining a reference oscillation output; and
  a phase detector for detecting a phase difference between the reference oscillation output and the burst signal, the first color carrier being the output from the voltage-controlled variable oscillator which is controlled by a voltage corresponding to the detected phase difference.

5. An apparatus according to claim 4, wherein the modulating means includes means for performing balanced modulation of the first color carrier and converting the recording chroma signal into a low frequency signal.

6. An apparatus according to claim 1, wherein the means for obtaining a second color carrier includes a circuit for correcting the phase of the first color carrier.

7. An apparatus according to claim 1, wherein the means for obtaining a color signal includes first and second adjusters for respectively adjusting levels of the first and second color carriers.

8. An apparatus according to claim 1, wherein the means for generating additional image information includes a memory circuit for storing the additional image information and a timing circuit for setting write and read timings with respect to the memory.

9. An apparatus according to claim 8, wherein the memory stores binary data of a luminance signal included in a video signal as the additional image information.

10. An apparatus according to claim 1, wherein the means for inserting the color signal includes means for switching between the chroma signal and the color signal in accordance with the additional image information.

11. An apparatus according to claim 1, wherein the modulating means includes means for converting a low-frequency chroma signal reproduced from a video head into a high-frequency chroma signal having an original frequency; and
  the extracting means includes a filter for removing any unnecessary component of the high-frequency chroma signal and means for extracting the burst signal from the high-frequency chroma signal.

12. An apparatus according to claim 11, wherein the generating means includes:
  a reference oscillator for obtaining a reference oscillation output corresponding to a color subcarrier frequency;
  a phase detector for detecting a phase difference between the reference oscillation output and the burst signal; and
  a phase-locked loop circuit for phase-locking the burst signal with the reference oscillation output by controlling a conversion carrier used in the means for converting a low frequency chroma signal in accordance with a phase difference output from the phase detector.

13. An apparatus according to claim 12, wherein the means for obtaining a second color carrier receives an output from the reference oscillator as the first color carrier.

14. An apparatus according to claim 13, wherein the means for inserting the color signal receives the high-frequency chroma signal from the filter.

15. A video recording apparatus comprising:
  an automatic color control circuit for receiving a chroma signal included in a recording video signal and controlling a gain of the chroma signal so as to set a burst signal thereof to a predetermined level;
  a phase-locked loop circuit for extracting the burst signal of a chroma signal output from the automatic color control circuit and generating a carrier phase-locked with the burst signal;
  means for performing balanced modulation of the output carrier from the phase-locked loop circuit and generating a carrier for converting the chroma signal into a low-frequency chroma signal;
  means for generating a color signal by mixing the first color carrier output from the phase-locked loop circuit with a second color carrier obtained by shifting the phase of the first color carrier;
  means for inserting the color signal into the recording chroma signal; and
  a circuit for generating additional image information to be inserted into the chroma signal, said circuit controlling the means for inserting the color signal.

16. A video reproducing apparatus comprising:
  means for converting a low-frequency converted chroma signal reproduced from a video head into a high-frequency chroma signal having an original frequency;
  a comb filter for removing any unnecessary component of the high-frequency chroma signal;
  a phase-locked loop circuit for extracting a burst signal from the high-frequency chroma signal, detecting a phase difference between the burst signal and an output from a reference oscillator, and phase-locking the burst signal with the output from the reference oscillator by controlling a conversion carrier used in the frequency converting means on the basis of the phase difference;
  means for generating a color signal by mixing a first color carrier as an output from said reference oscillator with a second color carrier obtained by shifting the phase of the first color carrier;
  means for inserting the color signal into the high-frequency chroma signal; and
  a circuit for generating additional image information to be inserted into the high-frequency chroma signal, said circuit controlling the means for inserting the color signal into the high-frequency chroma signal.

* * * * *